United States Patent [19]

Matsumoto

[11] 4,061,378
[45] Dec. 6, 1977

[54] CASSETTE TAPE RECORDER HAVING IMPACT ABSORBING MECHANISM FOR COVER PLATE

[75] Inventor: Shigeru Matsumoto, Yokohama, Japan

[73] Assignee: Victor Company of Japan, Limited, Japan

[21] Appl. No.: 643,759

[22] Filed: Dec. 23, 1975

[30] Foreign Application Priority Data

Dec. 24, 1974  Japan .................................. 49-156249

[51] Int. Cl.² ........................................... A47B 81/00
[52] U.S. Cl. ..................................... 312/20; 312/276; 312/319
[58] Field of Search ................. 312/20, 319, 276, 311, 312/DIG. 29, DIG. 30; 292/338; 188/269, 270; 285/350, 347

[56] References Cited

U.S. PATENT DOCUMENTS

| 448,889 | 3/1891 | Seely | 188/270 |
|---|---|---|---|
| 1,969,305 | 8/1934 | Hunter | 312/276 |
| 2,304,490 | 12/1942 | Yoder | 312/20 |
| 2,537,363 | 1/1951 | Minor | 312/276 |
| 2,689,775 | 9/1954 | Wolters | 312/311 |
| 2,799,550 | 7/1957 | Rataiczak | 312/319 |
| 2,902,327 | 9/1959 | Larsen | 312/276 |
| 3,055,724 | 9/1962 | Mazure | 312/319 |
| 3,195,969 | 7/1965 | Wallen | 312/276 |
| 3,466,383 | 9/1969 | Decker | 285/350 |
| 3,931,961 | 1/1976 | Fader et al. | 188/269 |

FOREIGN PATENT DOCUMENTS 374,464   6/1964   Switzerland .......................... 312/276

Primary Examiner—Paul R. Gilliam
Assistant Examiner—Victor N. Sakran
Attorney, Agent, or Firm—Robert E. Burns; Emmanuel J. Lobato; Bruce L. Adams

[57] ABSTRACT

In a tape recorder having an opening for accommodating a tape-containing cassette, a spring-loaded cover plate pivotally disposed over the opening to prevent intrusion of dust thereinto and a latch for locking the cover in a closed position, a fluid pressure mechanism is provided having a pair of mutually telescoping elements coupled between the cover plate and the recorder housing. One of the elements has a packing groove and a resilient elastic composition packing ring of normally circular cross section seated in the groove, the packing ring having an exterior periphery greater in circumference than the circumference of the bore of the other element so that the ring is compressed in the groove as the telescoping elements are in slidable contact with each other. One of the elements is provided with an air vent passage of a selected cross-sectional dimension through which the air inside the bore is allowed to escape when the telescoping elements move toward each other to absorb the impact acted upon the cover plate when the latch is released.

13 Claims, 7 Drawing Figures

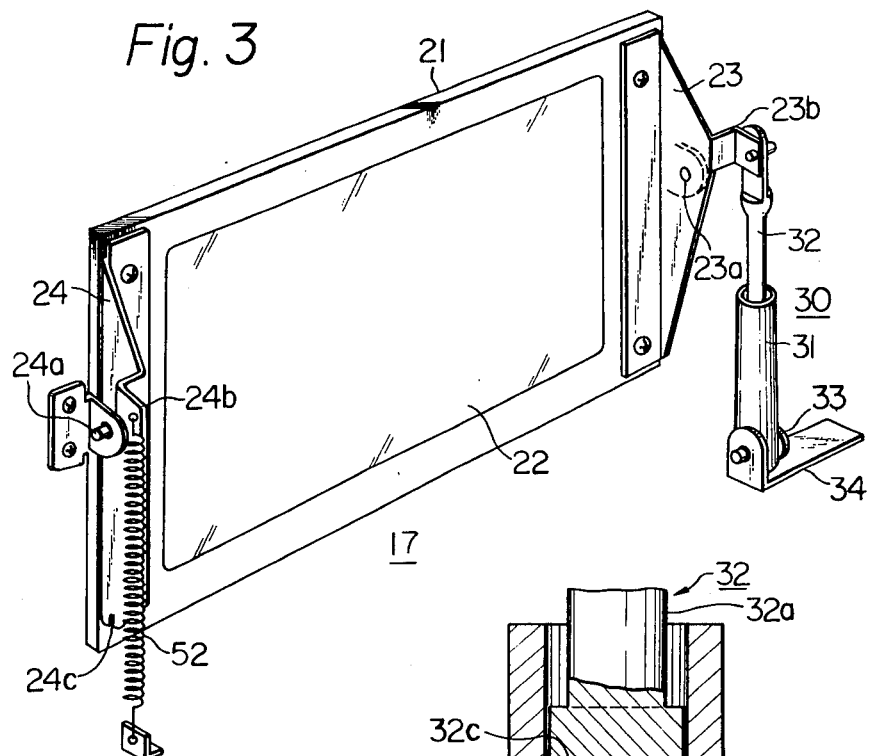
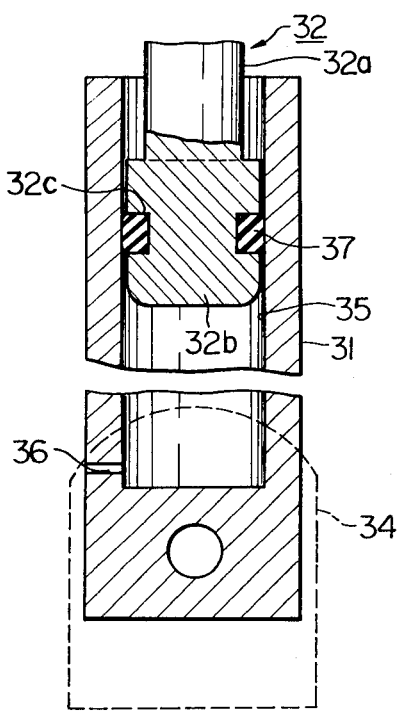

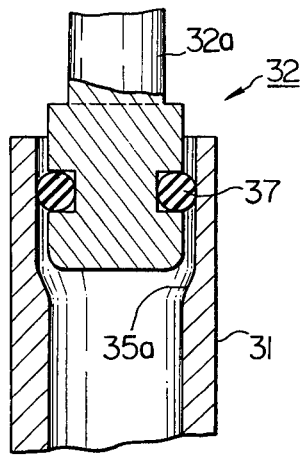
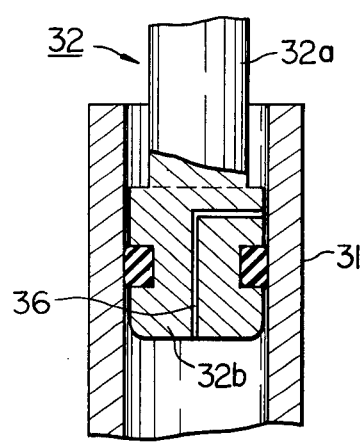
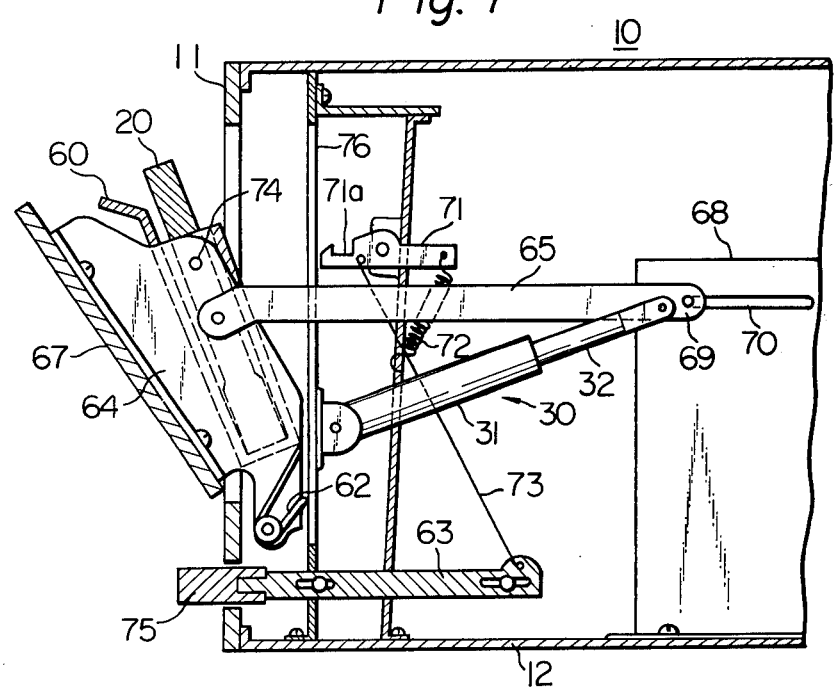

CASSETTE TAPE RECORDER HAVING IMPACT ABSORBING MECHANISM FOR COVER PLATE

BACKGROUND OF THE INVENTION

The present invention relates to tape recorders, and in particular to tape recorders of the type adapted to operate tape-containing cassettes, and more particularly it relates to an improvement in a mechanism for operating a spring-loaded cover or lid to close the opening of the tape recorder through which the tape-containing cassette is inserted.

The tape recorder of the type which is adapted to operate tape-containing cassettes is usually provided with an opening through which the tape cassette is inserted for playing purposes and a spring-loaded cover plate which is pivotable between an open position in which the cassette is insertable through the opening and a closed position in which the opening is closed to prevent dust from entering the interior of the tape recorder. The force applied on the cover plate by the spring should be sufficiently strong to maintain it in one of the open and closed positions withstanding its weight. In some cases, this gives rise to an undesirable situation in which the cover plate when released tends to swing open at a fast speed and hit against an edge of the opening. This situation is worsened where a cassette holder is mounted on the rear side of the cover plate, since the cassette in the holder tends to be ejected from the holder, which results in marring of the cassette.

SUMMARY OF THE INVENTION

Therefore, the primary object of the present invention is to provide an improved tape recorder having an opening for accommodating a cassette and a cover plate which is spring biased in a direction toward its open position and latched in its closed position in opposition to the action of the spring, and a fluid pressure mechanism coupled to the cover plate in a manner that absorbs the energy of the spring triggered when the cover plate is unlatched.

Another object is to provide an improved fluid pressure mechanism particularly useful for the tape recorder, the mechanism comprising a pair of mutually telescopable members, such as a piston formed with a packing groove and a cylinder with an air vent passage, the piston being operatively coupled to the cover plate of the tape recorder and the cylinder being operatively coupled to the recorder housing in such manner that when the cover plate is in the normal closed position the telescoping members are in an extended position, the mechanism further comprising a resilient elastic composition packing ring of normally circular cross section seated in the packing groove, the inner periphery of the packing ring being slightly smaller in circumference than the circumference of the bottom of the groove and the exterior periphery of the packing ring being greater in circumference than the circumference of the cross section of the cylinder bore, whereby the packing is compressed as the piston is inserted into the cylinder to provide an air tight contact between the piston and cylinder, the cross-sectional dimension of the air vent passage being selected such that the pressure within the cylinder bore sharply increases when the telescoping members move toward each other.

Another object is to provide an improvement to the fluid pressure mechanism in which the cylinder bore has a gradually increasing cross section toward the piston to allow the packing ring to expand to the normal circular cross section when the piston and cylinder are in the extended position to thereby prolong the life of the packing ring.

BRIEF DESCRIPTION OF THE DRAWINGS

These and other objects, features and advantages of the present invention will be understood from the following description when read in conjunction with the accompanying drawings, in which:

FIG. 3 is a perspective view of the cover plate shown coupled to a fluid pressure mechanism of the invention;

FIG. 4 is a fragmentary cross section view of the fluid pressure mechanism;

FIG. 5 is a fragmentary cross section view of the fluid pressure mechanism in a preferred form;

FIG. 6 is a fragmentary cross section view of the fluid pressure mechanism in an alternative form; and FIG. 7 is a cross sectional view of the tape recorder in a second embodiment of the invention.

DESCRIPTION OF THE PREFERRED EMBODIMENTS

Figure 1:
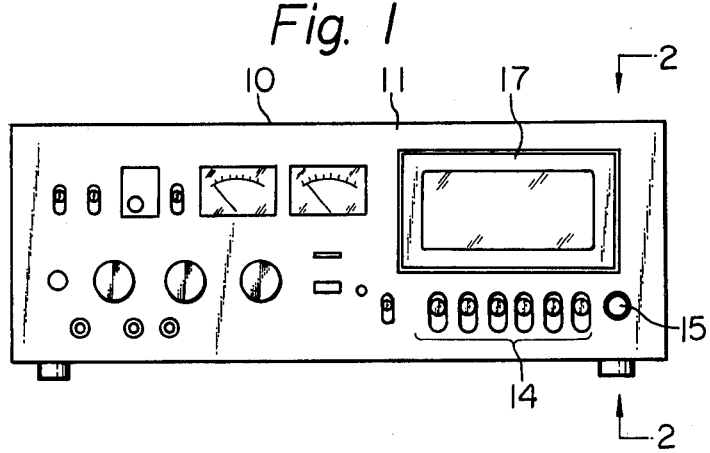
FIG. 1 is a front elevation view of a tape recorder of the type having an opening for accommodating a tape-containing cassette and a spring-biased cover plate disposed over the opening.
Figure 2:
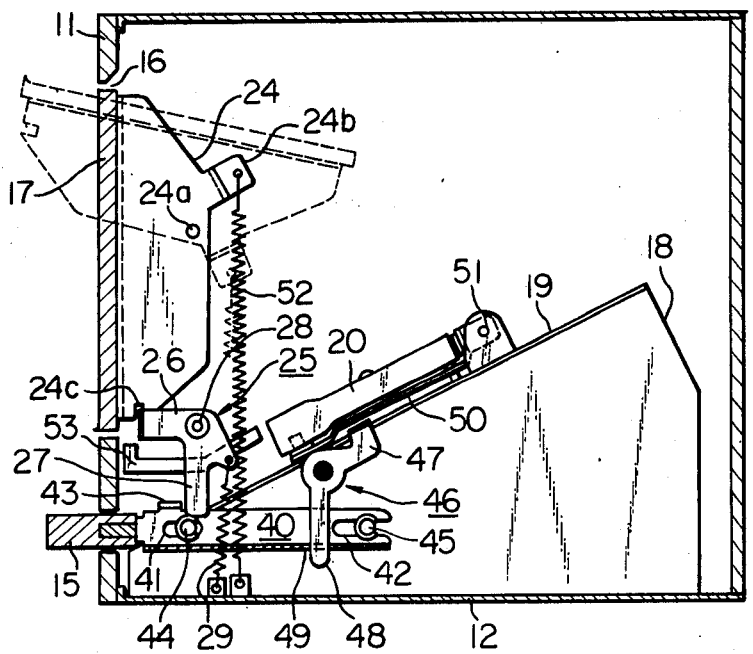
FIG. 2 is a cross sectional view taken along the section lines 2—2 of FIG. 1 showing one embodiment of the invention.

Referring now to the drawings, a tape recorder embodying the invention comprises a housing 10 enclosing all of the parts required for operating a tape cassette, a row of operating push-buttons as indicated by a numeral 14 associated with the drive mechanism of the tape recorder in conventional manner. The housing 10 is formed with a rectangular opening 16 on the front panel 11 for accommodating a tape cassette. A cover plate 17 is provided to cover the rectangular opening 16 to exclude extraneous matter. The tape recorder also incorporates a release button 15 to open the cover plate 17. On the base plate 12 of the housing 10 is disposed a cassette support 18 having an inclined surface 19 on which is placed a tape cassette 20 in playing position (FIG. 2).

The cover plate 17 has a rectangular shaped frame 21 and a transparent plate 22 fitted into the frame 21 to make the inside of the tape recorder visible from outside. At opposite sides of the frame 21 are attached flanges 23 and 24 having pivot holes 23a and 24a, respectively. Each of the flanges has an extension 23b (24b) adjacent to the pivot hole 23a (24a). The flange 24 has a notch 24c which slips over a latch 26 of a bell crank 25 which is pivoted at 28 and urged clockwise by a compression spring 29, one end of which is coupled to the base plate 12.

When the latch 26 is in engagement with the notch 24c, the cover plate 17 is held in an upright position in which the opening 16 is fully closed. The release button 15 is connected with a slide member 40 having slots 41 and 42 engaged with rollers 44 and 45 which are attached to side wall of the support 18 as shown in FIG. 2. The support 18 also pivotally mounts a cassette ejection bell crank 46 on the side wall thereof having an upper lug 47 and a lower lug 48 extending through a hole 49 on the slide member 40.

The tape cassette 20 is seated on a holder plate 50 which is pivoted at the upper end as at 51. The cassette 20 under this condition is engaged with the driving mechanism (not shown) of the tape recorder in conventional manner.

The cover control bell crank 25 is also provided with a lug 27 which extends downward from the pivot point 28. The slide member 40 has a lug 43 on the upper side thereof to come into abutment with the lug 27 of the bell crank 25 when the release button 15 is pushed rightward in FIG. 2.

The cover plate 17 is urged in a clockwise direction by means of a spring 52 coupled between the extension 24b of flange 24 and the baseplate 12, so that it keeps its upright closed condition in opposition to the force of spring 52.

When the release button 15 is pushed rightward, the lug 43 of the slide member 40 comes into abutment with the lug 27 of bell crank 25 to cause it to rotate counterclockwise allowing the cover plate to rotate clockwise under control of the force of the spring 52, so that the opening 16 is opened. The rightward movement of the actuating rod 40 simultaneously causes it to abut the lower lug 48 of bell crank 46 so that the crank 46 is rotated counterclockwise, with the result of which the upper lug 47 of bell crank 46 pushes the holder plate 50 to rotate it clockwise about pivot 51. This disengages the tape cassette 20 from the drive mechanism of the tape recorder and allows it to slide down over the holder plate 50 and rest upon a receptacle 53. When released, the cover plate 17 would fling open by the sudden action of spring 52 and strike against the upper edge of the opening 16 and mar the contacting elements.

In order to prevent this from taking place, the fluid pressure mechanism 30 comprises a cylinder 31 and a piston 32 slidably received in the cylinder 31. The cylinder 31 has its lower end pivotally coupled to the baseplate 12 and the piston 32 has its upper end pivotally connected to the extension 23b of the cover plate flange 23.

As best seen in FIG. 4, the cylinder 31 is apertured at its lower end to allow a pivot pin 33 to extend therethrough to an angled member 34 attached to the baseplate 12, and has a bore 35 which terminates in a closed end and a small air vent passage 36 therein which communicates the interior of the bore 35 with the atmosphere. The piston 32 comprises a piston stem 32a, the upper end of which is pivotally coupled to the extension 23b, and a piston head 32b. The piston head 32b is provided with a peripheral packing groove 32c having flat parallel side walls normal to the axis of the piston and a flat bottom or peripheral wall, as illustrated. A packing ring 37 is seated in the packing groove 32c. The packing ring is perfectly circular in cross section prior to its assembly and insertion in a cylinder and possesses a normal circular cross section as shown in FIG. 5. Its inner periphery is slightly less in circumference than the circumference of the bottom of the groove 32c in the piston head 32b, while its exterior peripheral circumference is a greater than the circumference of the inner cylinder wall, so that when the packing is slid with the piston into the cylinder, the ring is compressed to have somewhat ellipsoidal or rectangular cross section as shown in FIG. 4, conforming rather closely to the cross sectional shape of the groove 32c in the piston head. This provides an air tight contact between the piston 32 and cylinder 31 so that the interior of the cylinder 31 is only communicated with the atmosphere through the air vent passageway 36.

Since the piston 32 is coupled to the flange 23 of cover plate 17, the clockwise rotation of the plate 17 by the force of spring 52 causes the working face of the piston head 32b to move downward to compress the air inside the cylinder bore 35. The cross-sectional size of the passage 36 is selected such that the pressure within the cylinder bore is sufficiently increased to absorb the initial impact of the spring 52 when the cover plate 17 is released and decreased gradually as the air continues to escape through the passage 36 to the atmosphere. Therefore, the cover plate 17 is released at a high speed and then continues to open the opening 16 at a slow rate until the cylinder interior reaches atmospheric pressure when the force of spring 52 ceases to exist, as indicated by dotted lines in FIG. 2. The location of the air vent passage 36 is not necessarily provided at the cylinder 31, it may be provided in the piston head 32b as shown in FIG. 6.

In FIG. 5, the cylinder bore 35 at the open end portion of the cylinder has a circumference greater than the outer peripheral circumference of the packing ring 37 having normally circular cross section. The enlarged bore at the open end of the cylinder terminates in a tapered peripheral inner surface 35a, as illustrated, to facilitate insertion of the piston head 32b since the packing ring 37 is gradually compressed by the tapered surface 35a as the piston 32 moves downward. To facilitate insertion of the piston 32, the working face of the piston head 32b is rounded about its periphery. The tapered face 35a is so positioned that when the cover plate 17 is in the closed position, the piston head 32b is positioned within the enlarged bore portion so that the packing ring 37 takes the normal circular cross section as long as it keeps its resilience.

Since the cover plate 17 is normally closed, and hence the piston head 32b is normally positioned within the enlarged bore portion, the packing ring 37 takes the normal circular cross-sectional shape for a longer period of time than it is compressed within the narrow region of the bore 35. Therefore, the material of the packing ring 37 is kept alive for a long period of time. The packing ring 37 in groove 32c is thus compressed and then expands in correspondence with the movements of the cover plate 17. This process of compression and expansion also enables the material of the packing ring to prolong its resiliency.

The material of the packing ring 37 is made of rubber or any resilient elastic composition which is resistant to wear and leakage throughout prolonged severe tests and has sufficient resiliency to return to the normal circular cross sectional shape when not in compression.

The fluid pressure mechanism 30 of the invention is further employed to advantage to prevent ejection of cassette 20 from a cassette holder 60 which is mounted on the rear side of the cover plate 67 when the same is released from the locked or closed position, as shown in FIG. 7. In this embodiment, the cover plate 67 is provided with flanges 64 at the opposite sides and the cassette holder 60 is supported by the flanges 64 at an angle to facilitate insertion of the cassette 20. The cover plate 67 is connected to a support 68 by a connecting rod 65, one end of which is pivotally connected to the flange 64 and the other end slidably supported by the support 68 by a pin-and-slot connection 69, 70. A latch 71 having a notch 71a is biased by a spring 72 in a clockwise direction to engage a lug 74 provided on the flange 64 when the cover plate 67 is closed. A release button 75 is connected to one end of a slidable rod 63, the other end of which is connected to the latch 71 by a connecting rod 73 so that when the release button is depressed the latch 71 is rotated counterclockwise to disengage the lug 74. The cover plate 67 is biased by a spring 62 in a counterclockwise direction to keep it open after the lug 74 is disengaged from the notch 71a of latch 71. The cylinder 31 of the fluid pressure mechanism 30 is connected pivotally to a frame member 76 of the housing 10 and the piston 32 is pivotally connected to one end of the connecting rod 65. When the cover plate 67 is closed, the connecting rod 65 is retracted in a position remote from the front panel 11 and the pair of the relatively moving elements 31 and 32 of the fluid pressure mechanism 30 is in an extended condition, with the lug 74 being seated in the notch 71a. When the cover 67 is opened upon disengagement of the lug 74 from notch 71a, the connecting rod 65 moves to a position adjacent the front panel 11, as illustrated, as a result of which the moving elements 31 and 32 move toward each other to a retracted position. As mentioned previously, while the retracting movement of the fluid pressure mechanism 30 is effected, the counterclockwise pivotal movement of the cover plate 67 will be retarded by an increase in pressure in the cylinder 31 and open at a slow speed determined by the cross sectional size of the air vent passage 36 in the mechanism 30, so that the cassette 20 is prevented from ejecting from the holder 60.

What is claimed is:

1. A cassette-tape recording and reproducing apparatus comprising, in combination, a housing having an opening for accommodating a tape cassette therein, a cover plate for said opening pivotally supported to be manually rotatable from an open position to a closed position, means for pivotally supporting said cover plate for movement relative to said housing and opening, urging means for constantly urging the cover plate to rotate from said closed position constantly to said open position, locking means for releasably locking the cover plate in said closed position, means manually operable from outside of the housing for selectively releasing the locking means, and a shock absorber connected between the cover plate and the housing to absorb energy developed when said cover plate is rotated from said closed position to said open position by said urging means upon release of said locking means by manual operation of said releasing means.

2. A cassette-tape recording and reproducing apparatus as claimed in claim 1, wherein said shock absorber comprises a pair of mutually telescoping elements relatively movable between an extended position and a retracted position, means for connecting one of said elements to the cover plate and means for connecting the other to the housing such that when the cover plate is in the closed position said telescoping elements are in said extended position, one of said elements having a bore to slidably receive the other element, one of said elements having a packing groove and a resilient elastic composition packing ring of normally circular cross section positioned in said groove in a resilient, slidable contact with the other element, one of said elements having an air vent passage communicating the interior of the bore with the atmosphere, the air vent passage being dimensioned such that the pressure within the bore sharply changes when said telescoping elements move relatively to each other upon said locking means being released to thereby absorb the initial force of the urging means.

3. A cassette-tape recording and reproducing apparatus as claimed in claim 2, wherein the position of said packing groove in one of said telescoping elements in relation to the other element is such that said packing ring in said groove assumes a circular cross-sectional shape when said cover plate is in said closed position.

4. A cassette-tape recording and reproducing apparatus as claimed in claim 2, wherein the inner periphery of said packing ring is slightly smaller in circumference than the circumference of the bottom of said groove and the exterior periphery of the packing ring is greater in circumference than the circumference of the cross section of said bore, whereby said packing ring is in compression when said telescoping elements are in the retracted position.

5. A cassette-tape recording and reproducing apparatus as claimed in claim 4, wherein the position of said packing groove in one of said telescoping elements in relation to the other element is such that said packing ring in said groove assumes a normal circular cross section when said telescoping elements are in the extended position.

6. A cassette-tape recording and reproducing apparatus as claimed in claim 5, wherein said telescoping elements comprise a piston and a cylinder, said packing groove being provided in said piston and said cylinder having said bore, and wherein said bore has a gradually increasing cross section toward the piston to allow the packing ring in said groove to expand to the normal circular cross section when the piston and cylinder are in said extended position.

7. A cassette-tape recording and reproducing apparatus as claimed in claim 1, further comprising means mounted on the rear side of the cover plate for holding the tape cassette therein.

8. The combination comprising, a housing having a compartment therein open at one side of the housing to receive an article therein, a cover plate pivotally supported by the housing between a first position in which said compartment is open to the atmosphere and a second position in which said compartment is closed thereby, means for urging the cover plate in a direction toward said first position, means for locking the cover plate in said second position, means for releasing the locking means, and a fluid pressure mechanism comprising:

a pair of relatively movable telescoping members, one of said members being connected operatively to the cover plate and the other being operatively connected to the housing such that when the cover plate is in the second position said telescoping members are in an extended position, one of said members having a packing groove, and a resilient elastic composition packing ring of normally circular cross section positioned in said groove in a resilient, slidable contact with the other element, one of said members having a bore to receive the other member through an open end, one of said members having an air vent passage communicating the interior of said bore to the atmosphere, the inner periphery of said packing ring being slightly smaller in circumference than the circumference of the bottom of said groove and the exterior periphery of the packing ring being greater in circumference than the circumference of the cross section of said bore, whereby said packing ring in said groove is in compression when said telescoping members are in a retracted position, the cross-sectional dimension of said air vent passage being selected such that the pressure within the bore sharply increases when said telescoping members move toward each other upon said locking means being released to thereby absorb the initial force of the urging means.

9. The combination as claimed in claim 8, wherein the position of the packing groove in one of said telescoping members in relation to the other member is such that said packing ring in said groove takes the normal circular cross section when said telescoping elements are in the extended position.

10. The combination as claimed in claim 9, wherein said telescoping members comprise a piston and a cylinder, said packing groove being provided in said piston and said cylinder having said bore, and wherein said bore has a gradually increasing cross section toward the piston to allow said packing ring in said groove to expand to the normal circular cross section when the piston and cylinder are in said extended position.

11. A cassette-tape recording and reproducing apparatus as claimed in claim 1, wherein said cover plate is provided with a pair of parallel side plates substantially in a bell crank configuration each having an arm extending inwardly from said opening and connected to said urging means, whereby the cover plate is pivotally rotatable about the fulcrum point of each of said side plates, said fulcrum point being located such that when said locking means is released said cover plate is caused to rotate upwardly and a substantial part of the cover plate is concealed within said housing.

12. A cassette-tape recording and reproducing apparatus as claimed in claim 11, wherein said shock absorber comprises a pair of telescoping elements relatively movable between an extended position and a retracted position, means for connecting one of said elements to the cover plate and means for connecting the other being to the housing such that when the cover plate is in the closed position said telescoping elements are in said extended position, one of said elements having a bore to slidably receive the other element, one of said elements having a packing groove and a resilient elastic composition packing ring of normally circular cross section positioned in said groove in a resilient, slidable contact with the other element, one of said elements having an air vent passage communicating the interior of the bore with the atmosphere, said bore having a cross section smaller than the exterior periphery of the packing ring whereby said packing ring is in compression when said telescoping elements are in the retracted position, and said bore having a larger cross section than said first-mentioned cross section to allow said packing ring to expand to its normal dimension when said telescoping elements in the extended position.

13. A cassette-tape recording and reproducing apparatus as claimed in claim 11, wherein said locking means comprises a bell crank with its fulcrum point mounted on said housing and having a first arm engageable with one of said side plates and a second arm engageable with said releasing means to disengage said first arm from contact with said side plate, and means for biasing said bell crank in a direction to cause said first arm to engage said one of the side plates.

* * * * *